United States Patent [19]
Ehlig

[11] 3,865,929
[45] Feb. 11, 1975

[54] HYDROGEN FLUORIDE RECOVERY PROCESS
[75] Inventor: William Hollis Ehlig, Baytown, Tex.
[73] Assignee: E. I. du Pont de Nemours and Company; Wilmington, Del.
[22] Filed: Oct. 11, 1972
[21] Appl. No.: 296,565

[52] U.S. Cl.............. 423/488, 55/71, 55/73, 423/485, 423/574, 423/242
[51] Int. Cl.............................. C01b 7/22
[58] Field of Search..... 55/71, 73; 23/293 S, 295 R; 423/484, 483, 488, 485, 658.5, 574, 220, 222, 240, 242

[56] References Cited
UNITED STATES PATENTS

| | | | |
|---|---|---|---|
| 2,414,884 | 1/1947 | Matuszak | 423/484 |
| 2,775,311 | 12/1956 | Voreck | 55/73 |
| 2,780,307 | 2/1957 | MacAfee | 55/73 |
| 3,097,917 | 7/1963 | Dotts | 55/73 |
| 3,167,391 | 1/1965 | Swinehart | 55/71 |
| 3,347,022 | 10/1967 | Quarles | 55/73 |
| 3,412,528 | 11/1968 | Migule | 55/71 |

*Primary Examiner*—A. Louis Monacell
*Assistant Examiner*—S. J. Emery

[57] ABSTRACT

Crude hydrogen fluoride gas is fed into a gas cooler wherein the gas is cooled by evaporating a recirculating liquid stream containing liquid hydrogen fluoride. This liquid stream removes sulfur impurities from the crude gas. The recirculating stream is recycled through the gas cooler a sufficient number of times until the sulfur impurities build up to a particle size that is easily removed by conventional liquid-solid separating techniques such as filtration. A portion of the recirculating stream is continuously drawn off and the sulfur particles are removed. The cooled gas is taken off overhead and subsequently condensed to form crude liquid hydrogen fluoride. The removal of the sulfur in the gas cooler prevents the buildup of sulfur coatings on the heat transfer surfaces of the condenser and subsequent processing equipment.

2 Claims, 1 Drawing Figure

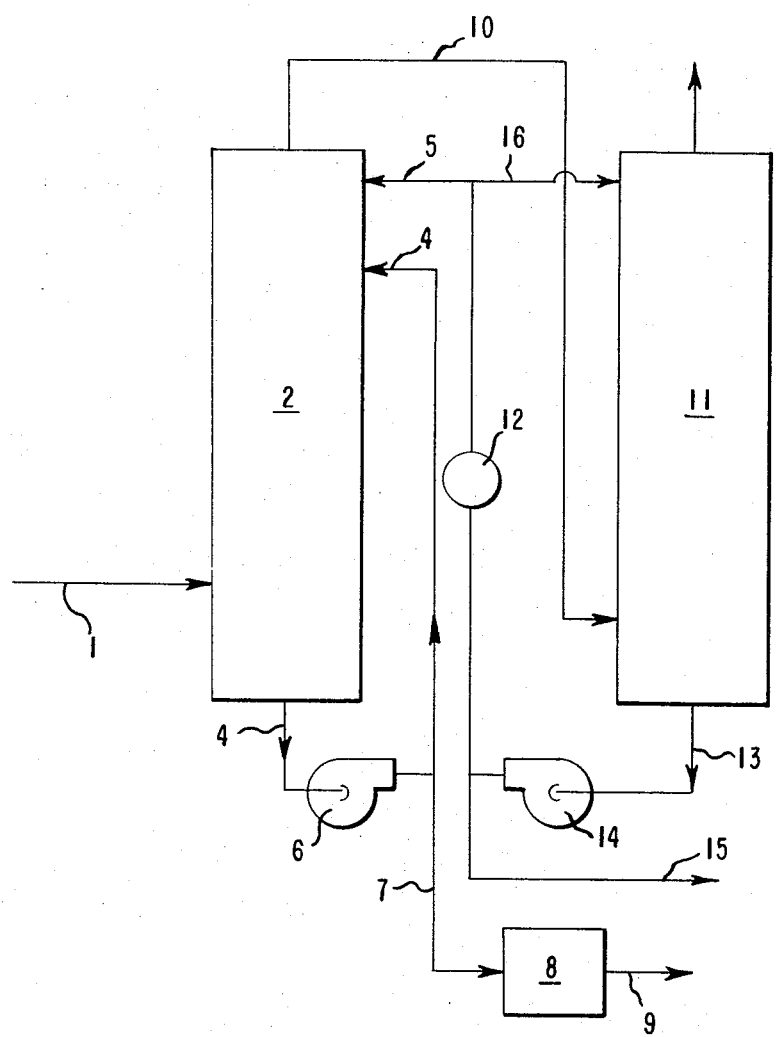

HYDROGEN FLUORIDE RECOVERY PROCESS

BACKGROUND OF THE INVENTION

Hydrogen fluoride is produced commercially by the reaction of a fluorine-containing mineral, e.g., fluorspar, with a mineral acid, sulfuric acid, at temperatures varying from 100° to 300° C. The reaction product from the initial reaction is then cooled, condensed and subsequently refined to produce anhydrous hydrogen fluoride.

In processes such as above, the initial reaction products will contain contaminants, including sulfur and sulfur forming impurities. These contaminants can cause problems in the subsequent steps of condensing and recovering the hydrogen fluoride by being deposited upon the piping and heat transfer surfaces.

BRIEF SUMMARY OF THE INVENTION

I have discovered that the problem of sulfur deposition can be solved in the following manner.

The crude hydrogen fluoride gas containing the sulfur is fed into a gas cooler wherein the gas stream is cooled to a range of 0° to 15° C. above the boiling point of hydrogen fluoride at the cooler pressure by evaporating HF from a recirculating liquid stream in direct contact with the crude hydrogen fluoride gas. The liquid stream flows counter-current to the crude gas and the sulfur transfers from the gas to the liquid phase. The sulfur forms particles in the recirculating liquid stream and the sulfur is retained in the liquid stream for a sufficient time, e.g., by recycling the stream through the cooler, until the particles build up to a size that can be easily removed by conventional filtration or other solid liquid separating techniques. A portion of the recirculating stream is continuously removed and filtered to remove the sulfur particles. The hydrogen fluoride gas, essentially free from sulfur, is continuously removed from the top of the gas cooler and condensed to produce liquid hydrogen fluoride.

DESCRIPTION OF THE DRAWING

The FIGURE is a flow chart of an embodiment of the process of the invention.

DESCRIPTION OF THE INVENTION

The process of the invention is applicable to any reaction for producing gaseous hydrogen fluoride wherein the gaseous, crude product contains sulfur contaminants. Thus the process can be used in conjunction with the well known commercial process for producing hydrogen fluoride by reacting fluorspar with sulfuric acid at temperature from 100° C. to the boiling point of $H_2SO_4$ at the reactor pressure.

In this process the fluorspar and sulfuric acid react to form calcium sulfate and hydrogen fluoride. The reaction is endothermic and various methods are used for supplying the necessary heat. One particularly useful method of supplying this heat is by the addition of sulfur trioxide and steam to the reaction zone. This method is described in detail in U.S. Pat. No. 3,102,787.

Although the process of the invention is particcularly applicable to these commercial processes, it is also applicable to other processes wherein a gaseous, sulfur-containing crude hydrogen fluoride is produced, e.g., the acid attack of other fluorine-containing minerals.

The following paragraphs will describe the process of the invention as it particularly pertains to the fluorspar-sulfuric acid reaction, it being understood that the process of the invention is not so limited and can be easily adapted to crude hydrogen fluoride gases produced by other reactions.

The hydrogen fluoride gas from the fluorspar-sulfuric acid reaction will normally leave the reaction zone at a temperature between 100° and 250° C., usually about 170° C. This gas stream is primarily hydrogen fluoride and saturated with $H_2SO_4$ vapor; however, it does contain impurities from the reaction zone. These impurities will vary with the composition of the raw materials used in the reaction.

In most operations the gas stream from the reaction will contain small particles of fluorspar and/or calcium sulfate, thus initially the stream is fed into a gas scrubber wherein it is scrubbed with sulfuric acid to remove the dust. The gas leaving the dust scrubber will be at about its dew point and at a temperature of 60° to 200° C., normally about 140° C. This gas stream will be labeled the crude hydrogen fluoride gas stream.

As previously mentioned, this crude hydrogen fluoride gas stream contains impurities which include the elements or compounds of Group VI A of the Periodic Chart of the Elements. Examples of these impurities are sulfur, sulfur dioxide, sulfuric acid, silicon tetrafluoride, fluorosulfuric acid, hydrogen sulfide, calcium sulfate, water, selenium and tellurium and their compounds. Furthermore, it is believed that some of the components of the crude gas stream react with each other under the conditions of the cooling and other recovery steps to produce sulfur, i.e., the $SO_2$ present may react with hydrogen sulfide.

It is particularly the sulfur and sulfur-forming impurities present in this gas stream that create the problems in the subsequent recovery steps. The term "sulfur" as used hereinafter and in the claims include these sulfur forming compounds as well as elemental sulfur.

The sulfur particles which normally form in the gas stream during crude recovery normally have a size of 5 microns and less in diameter. These tiny particles of sulfur and other Group VI A elements adhere to any relatively cold surface in the process equipment, e.g., the surfaces of heat exchangers which are removing heat from this gas stream. The surface films formed by this sulfur greatly reduce the heat transfer effectiveness of the equipment. In many operations the fouling of these surfaces greatly reduces the capacity of the hydrogen fluoride recovery system such that the heat transfer equipment must be greatly oversized in order to match the capacity of the hydrogen fluoride reaction equipment. In addition, the removal of this film from the heat transfer surfaces is a costly and time-consuming operation.

The manner in which the process of the invention removes these sulfur contaminants from the crude gas will now be explained with reference to the FIGURE.

The crude hydrogen fluoride gas 1 is fed into a gas cooler 2. As previously mentioned, this crude hydrogen fluoride gas is normally at a temperature of about 140° C. and at or near its dew point, and it may have been treated to remove solids.

The crude hydrogen fluoride gas is discharged into the gas cooler 2. In the coolder liquid hydrogen fluoride droplets fall through the rising crude gas stream. This step cools the crude gas by the evaporation of hydrogen fluoride from the liquid phase.

Further, the sulfur present in the crude gas is transferred into the liquid phase.

The crude gas stream when it enters the gas cooler is saturated with sulfur vapor. As the gas stream is cooled, the sulfur is changed to liquid or solid sulfur depending upon the temperature of the gas stream. Thus the sulfur transfers from the gas phase to the liquid phase as extremely small particles, i.e., an ultimate particle size of about 5 microns. It is these small particles that adhere to the heat transfer surfaces and cause the fouling problems.

The process of the invention has the advantage in that it provides for the easy removal of these sulfur particles from the process by building up their particle size until they can be filtered.

This feature is accomplished by recirculating the liquid hydrogen fluoride droplets through the gas cooler a sufficient number of times until the sulfur particles contained therein build up to a size that is easily filtered. Normally this will mean a population of particles in various sizes, the majority of the particles being in the range of 100 to 150 microns in size. Three mechanisms which are likely to be important to the growth of the sulfur particle are: (1) The "Oswald Crystallization" effect in which the small particles dissolve and the dissolved material solidifies on the surface of the larger particle. (2) Continuous reaction of sulfur forming compounds in the high acidic medium of the liquid droplets creates supersaturation conditions necessary to larger particle growth. (3) Cyclic heating and cooling of the liquid sulfur containing phase encourages sulfur to come out of solution by reducing the level of supersaturation. These probable mechanisms are presented but not intended to exclude other mechanisms which can contribute to growth of the sulfur particles.

The number of times the liquid hydrogen stream should be recycled will vary depending upon the other parameters of the process, i.e., the temperature of crude gas, the temperature of the liquid hydrogen fluoride, the amount of sulfur in the crude, etc. In a typical embodiment if the liquid droplets are recirculated about 60 to 80 times, with the droplets being chilled and warmed up each cycle, the desired particle size is obtained. Recycle stream can be chilled by being contacted with cooled liquid hydrogen fluoride. The liquid stream is warmed by contact with the crude gas.

In the embodiment of the FIGURE, liquid hydrogen fluoride 5 at a temperature of −30° to +15° C. is fed into the top of the gas cooler 2. It is combined with and cools the recirculating stream 4 inside the cooler. The combined streams at a temperature between 10° and 30° C. then fall in the chamber of the gas cooler 2 counter-current to the crude gas. In the gas cooler the gas temperature at the top will range from 0° to 8° C. above the boiling point of hydrogen fluoride and the bottom temperatures will range from 15° to 30° C. The gas cooler can be operated at pressures of 10 to 15 psia. The amount of liquid hydrogen fluoride in stream 5 will equal or be slightly more than the amount of liquid hydrogen fluoride which has been evaporated from the recirculating stream during the previous pass through the cooler.

The liquid hydrogen fluoride falls to the bottom of the gas cooler where it is collected and pumped back to the top of the cooler 6.

The exact method by which the liquid phase removes the sulfur from the gas is not fully understood. A large excess of $SO_2$ is absorbed in the liquid HF and this excess $SO_2$ drives the following equilibrium reaction to completion.

$$SO_2 + H_2S \rightleftarrows S_2 + H_2O$$

Thus removing essentially all $S^{-2}$ species from the gas stream and therefore eliminating this source of sulfur formation in the balance of the system. It is believed that small particles of sulfur become suspended in the droplets of liquid hydrogen fluoride. The droplets, because of their acidic nature, promote the reactions of the gaseous sulfur forming compounds in the crude gas. These reactions will produce sulfur which is then deposited upon the suspended sulfur particles as the liquid is cooled. The continuation of this reaction and deposit with each cycle removes the sulfur from the crude gas and builds up the desired particle size in the liquid phase.

A portion 7 of the recirculation stream is fed to a filter 8 wherein the sulfur particles are removed by filtration. The filtrate 9 from the filter can be recycled to the gas cooler or, if desired, to the gas scrubber (not shown). The portion 7 removed is a function of the number of times the liquid phase is recycled through the gas cooler. Thus if a unit of the liquid phase is recirculated through the cooler 80 times to build up the sulfur particle size, the portion removed will be 1/80 of the recirculating stream.

The cooled hydrogen fluoride gas 10 leaves the top of the gas cooler at about its boiling point, 15°–22° C., and is fed into the gas condenser 11. At the top of this condenser is added liquid hydrogen fluoride 16 which has been cooled in a cooler 12 to a temperature below its boiling point. The liquid hydrogen fluoride is sprayed onto the gas, and when the gas stream is cooled below its boiling point, it will condense. If desired, a multi-stage condenser can be used.

The condensed hydrogen fluoride (at a temperature of 0° to 17° C.) is then removed as a bottoms liquid 13. The condenser bottoms is pumped to three points, (1) through the cooler 12 for recycle to the gas condenser 11, (2) to the gas cooler, and (3) to the refining system 15 (not shown). Uncondensed gas is hydrogen fluoride containing some impurities, e.g., silicon tetrafluoride, carbon dioxide, air, etc. The liquid hydrogen fluoride 15 is then refined to obtain pure anhydrous hydrogen fluoride in subsequent operations which are conventional in the art.

The process of the invention will now be illustrated by the following example.

EXAMPLE

Crude hydrogen fluoride gas produced by the reaction of fluorspar and sulfuric acid and having been scrubbed to remove solid impurities and cooled to 140° C. is fed to the base of a gas cooler at a rate of 14,680 lb/hr. The operating pressure for the gas cooler is 14.2 psia. The composition of this gas stream will vary somewhat with the process and with the raw materials used; a typical analysis for this gas stream is:

| | |
|---|---|
| $SiF_4$ | 2.7% by wt. |
| $CO_2$ | 1.3 |
| Air | 0.9 |
| $SO_2$ | 1.4 |
| S | less than 0.1 |
| $H_2S$ | less than 0.1 |

The remainder is hydrogen fluoride at its dew point with respect to sulfuric acid, fluorosulfuric acid, water and sulfur.

Liquid hydrogen fluoride 5 is sprayed into the top of the gas cooler (4.5 ft diameter by 12 ft high) at 9° C and 36,630 lb/hr. A typical composition for this liquid hydrogen fluoride is 1.9% $SO_2$, S less than 0.01% and the remainder HF with trace quantities of $H_2SO_4$, $HSO_3F$, and $H_2O$.

Liquid hydrogen fluoride 4 from the base of the cooler is sprayed below spray 5 at 134,300 lb/hr and 20° C. A typical composition for this stream is:

| | |
|---|---|
| $SO_2$ | 1.8% by wt |
| $H_2SO_4$ | 1.8 |
| $H_2O$ | 9 |
| S | 0.3 |

The remainder is hydrogen fluoride.

Another liquid stream from the base of the tower is fed at 1,700 lb/hr to the filter 8 were the sulfur is removed at a rate of 5 lb/hr. This is a batch filtration operation and therefore accumulates the solids sulfur for the term of the batch cycle. The length of the cycle is set by the size of the filter. Expressed as an hourly rate, the filter typically removes 5 lb sulfur and 25 lbs of liquid which is primarily HF.

The filtered liquid is returned to the dust scrubber upstream of line 1.

Cooled crude HF gas 10 flows at 49,610 lb/hr and about 22° C. from the top of the tower to the crude recovery facilities. The pressure of this gas stream is 13.8 psia. The typical analysis is:

| | |
|---|---|
| $SiF_4$ | 0.8% by wt |
| $CO_2$ | 0.4 |
| Air | 0.3 |
| $SO_2$ | 1.7 |

The remainder of this gas stream is HF and it is essentially free of elemental sulfur forming compounds.

The mean number of times a sulfur particle in the liquid stream falls through the cooler is 80. The particle size of the sulfur removed by the filter is up to about 100 microns major dimension. The filter cake resistance was less than 10 lb/sq in/inch of cake thickness.

I claim:

1. A process for recovering liquid anhydrous hydrogen fluoride comprising
    1. feeding crude hydrogen fluoride gas containing sulfur into a gas cooler at a pressure of about 10 to 15 pounds per square inch absolute wherein the gas is cooled to within a range of 0° to 15° C. above the boiling point of hydrogen fluoride at the cooler pressure by a recirculating liquid stream of hydrogen fluoride, said recirculating stream removing sulfur from the crude hydrogen fluoride gas;
    2. removing overhead hydrogen fluoride gas essentially free from elemental surfur and compounds which form elemental sulfur under conditions of cooling, condensing the gas to produce liquid hydrogen fluoride, while
    3. recycling each unit of the stream through the gas cooler until the sulfur removed from the crude hydrogen fluoride gas builds up to a particle size such that a majority of the particles of sulfur have a particle size of 100 to 150 microns,
    4. removing a portion of said recycling stream and filtering the sulfur therefrom,
    5. recycling the removed filtered liquid to the process.

2. The process of claim 1 wherein each unit of the stream is recycled through the gas cooler 60 to 80 times.

* * * * *